Aug. 9, 1966  J. W. DE BARR, SR  3,264,968
AUTOMATIC TRACKER
Filed Sept. 23, 1963  2 Sheets-Sheet 1

INVENTOR
JOHN W. DeBARR, SR.

BY *Fisher, Christen, Sabol & Caldwell*
ATTORNEYS

INVENTOR
JOHN W. DeBARR, SR.

BY Fisher, Christen, Sabol & Caldwell
ATTORNEYS

United States Patent Office 3,264,968
Patented August 9, 1966

3,264,968
AUTOMATIC TRACKER
John W. De Barr, Sr., 212 Donald Drive, Warrington, Fla.
Filed Sept. 23, 1963, Ser. No. 310,798
10 Claims. (Cl. 95—86)

The present invention relates to automatic tracking apparatus and particularly to apparatus of a character adapted to following the outline of a configuration from a remote vantage point.

The invention, while applicable to recorders in general, is explained in its application to the mounting of a television camera for automatic tracking of a race track to permit the exhibiting of the race on a remote screen, while also producing a permanent record on video tape. Obviously, other applications will suggest themselves as the invention is described.

In order to cover a race from a given point, it is necessary to provide motion of a limited universal type. For example, the camera must pan laterally of the track and also tilt in the vertical plane to follow the legs of the track. It is essential that these motions be available simultaneously, in a smooth pattern, and, in most applications, in a predetermined manner.

However, it may be desirable to vary the speed of the tracking operation in order that the particular animals being tracked may be kept in view at all times. Obviously, the apparatus is much more suited to filming or televising of a horse or dog race than, for example, automobile races, where the cars are not concentrated, but may be spread out with several laps separating entries.

In one embodiment of the invention a camera mount is adapted for pan and tilt type motion, relative to the track being followed, through the use of apparatus carried by a platform which pivots the camera mount relative to the frame or track. The tilt or pivot motion is preferably controlled by camming means which generally elevate the mount adjacent to the camera lens while following the race at the far end of the track. Conversely, for tracking at the near end of the track, the camera lens and adjacent mount are tilted downwardly with the tilt becoming effective for tracking along the direction defined as line-of-sight between the camera and the track.

The lateral displacement or panning of the camera relative to the track is afforded through a resolver device capable of translating rotary motion to panning motion.

When a generally oval shaped track is to be followed, the resolver means utilizes spiral logistics for the translating operation. This multi-directional motion translation is actually derived through analogue computer techniques. Thus, it will be appreciated that signals indicative of the motion components may be developed by the tracker and utilized remotely for various recorders.

In one form of the invention, the resolver may comprise an arm or a circular disc mounted for rotation. A motion transmitting connection is established between the resolver disc and the camera mount at a position displaced from the axis of the disc. For example, a vector arm may be fixed to the mount and extend over the resolver disc where a pivotal slide establishes the connection between the vector arm and the disc. When the disc is rotated, the slide pivots relative thereto and moves back and forth on the arm to impart a repetitive panning back and forth motion to the mount.

The resolver disc is provided with a series of locations for the pivot slide along a path which spirals from the center of the axis of the disc toward its periphery. These positions determine the angle of arc through which the mount or camera is panned and thus the device may be accommodated to various sized tracks, as well as disposed at various distances therefrom.

Other configurations may be traced, such as circular, by employing positions for the pivotal slide along a radius of the resolver disc where it corresponds to the position of the vector arm passing over the axis.

An alternative form of the invention accommodates close coupled race track operations, wherein short distances are available for the line-of-sight between the camera and track. In such an arrangement, a motion multiplier, in the form of a gear train, is interposed between the vector arm and the camera mount to enhance the motion transmitted, while, of course, retaining the translation from the rotating to reciprocal arc type motion. Of course, the motion multiplication may be obtained through the use of a servo amplifier, but in general this is more expensive than the method preferred herein.

It may thus be appreciated that with the use of the present invention mounting a television camera, a race can be viewed within the club house and/or judges' area as it takes place, rather than a few minutes thereafter, where film must be developed. Moreover, the use of a video camera with the present invention permits the development of a video tape as a "windfall," which tape may prove of immeasurable value for subsequent instructional purposes for enabling study of a close finish, and for catching fouls.

It will be appreciated that once set up, the apparatus of the present invention may be remotely initiated and will automatically track and display a race. At most, the only manual regulation necessary, might be the manipulation of the speed control, which of course, can be achieved by a viewer in the club house or at the remote location. Alternatively, the speed may be additionally progressively controlled by the use of infra-red light beams and associated relays at each one-quarter or one-third of the track, by way of example. The relays provide over-ride control of the speed of the drive motor. As a further alternative for use in tracking dog races, the speed control may be derived by simple wiring to the speed control of the rabbit. Therefore, the device of the present invention may replace a crew of two or more men, resulting in a considerable savings over the season.

With the foregoing in mind, it is among the objects of the invention to provide a versatile automatic tracker apparatus.

It is a further object of the invention to provide an automatic tracker capable of assembly from relatively inexpensive components to provide a reliable device.

A still further object of the invention is the provision of an automatic tracker capable of simultaneous panning and tilt motion.

It is yet another object of the invention to provide an automatic tracker, wherein rotating motion is translated into back and forth arcuate motion.

A still further object is the provision of such a tracker incorporating a motion multiplying arrangement.

The invention will be further described in detail in connection with the accompanying drawing, wherein.

Figure 1:
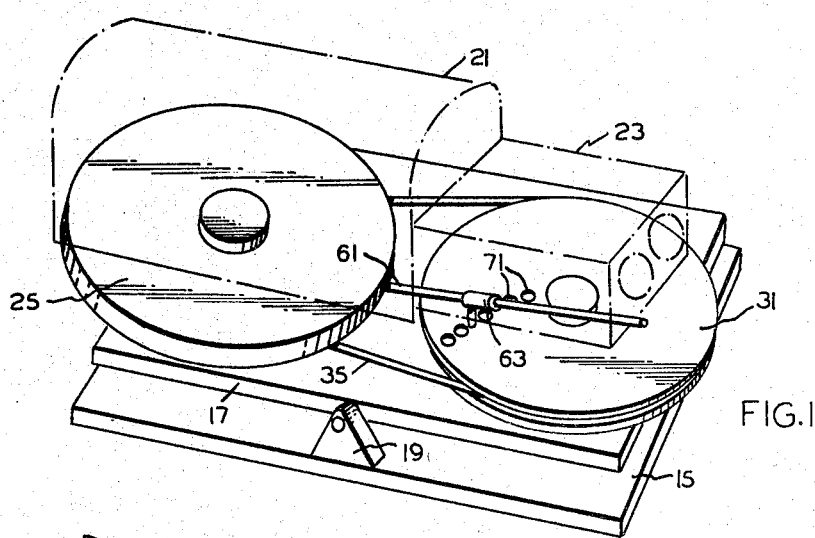
FIG. 1 is a view in perspective of automatic tracker apparatus in accordance with this invention.
Figure 2:
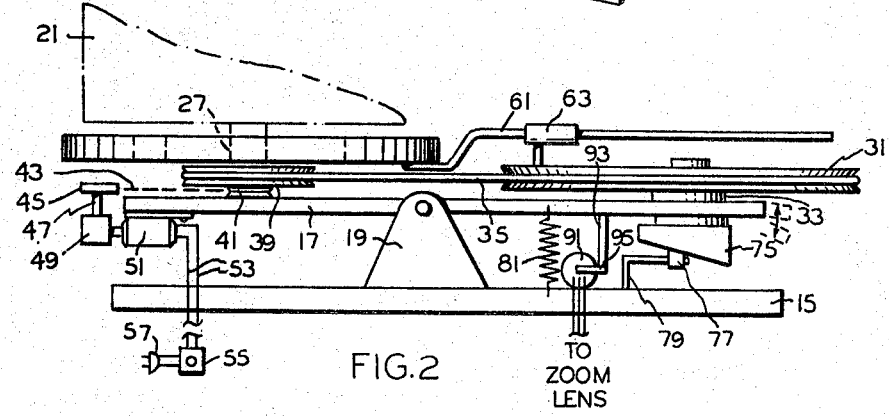
FIG. 2 is a view in side elevation of the apparatus of FIG. 1.

Referring now to the drawing, there is shown in FIGS. 1 and 2 a frame 15 upon which a platform 17 is supported for pivotal motion about the fulcrum 19. A camera 21 having a lens 23 is shown in dotted outline fixed upon a camera mount disc 25. While the camera mount is illustrated as a disc, it may comprise simply a sleeve or upright support for connection to the camera, it being necessary only that the mount 25 be supported for rotation or at least partial rotation. In this connection, a bearinged axis is illustrated in the form of sleeve 27, shown in dotted outline in FIG. 2.

The platform also supports a resolver disc 31 mounted for rotation relative to the platform on a bearinged sleeve or rod 33. The resolver disc 31 is driven through a V-belt 35, or the like, extending about its periphery and to a driving pulley 39 journalled on sleeve 27. The pulley 39 is in turn driven through a gear or pulley 41, fixed to pulley 39 and journalled on sleeve 27, and connected by a belt or gear sprocket chain 43 to a drive transfer roller 45. The roller 45 may comprise a rubber cylinder, in turn driven from shaft 47 by way of reduction gear box 49 and electric variable speed drive motor 51.

The latter motor is powered over electrical leads 53 which may in fact extend remotely to a potentiometer or speed control box 55, including an on-off switch (not shown), disposed between the motor 51 and plug 57 provided for connecting the motor to a common A.C. or D.C. main.

The circular motion of the resolver disc 31 is translated into panning motion for the mount 25 by a vector arm 61 and pivotal sleeve 63 slidable relative thereto. The vector arm is fixed to the mount 25 as by staples or other fastening means (not shown). The pivotal slide 63 is adapted to be inserted into any of the holes 71 in the resolver disc 31 for adjusting the angle of arc through which the mount will swing. The holes 71 are deployed along a spiral path from the center of disc 31 to its periphery to permit the selection of the particular size oval to be traced.

The slide 63 is free to pivot within the selected hole 71 as resolver disc 31 rotates, in order that it may slide along the vector arm 61.

It may be appreciated that the spiral followed by the holes 71 actually constitutes a spiral relative to a diameter or radius established by the vector arm 61 when it extends over the axis of the disc as, for example, the center of rod or sleeve 33. This is best illustrated in the perspective view of FIG. 3. It will be appreciated that when the sleeve 63 is disposed in one of the outer holes 71 near the periphery of the resolver disc 31, that the mount disc 25 will swing through a greater arc and will dwell for a shorter period along the sides of the oval relative to the operation with the slide 63 in one of the inner holes 71.

In this manner, there is provided adjustability as to the particular oval-like configuration size and also for the remoteness of the tractor from the track.

Tilting of the mount 25 is established simultaneously with the panning action by also utilizing the rotating motion of the resolver disc 31. This is achieved by disposing a tilt cam 75 on the lower or depending end of sleeve or rod 33 for rotation therewith. A tilt roller or follower 77 is journalled on a right angle shaft 79, in turn fixed to the frame 15 for abutting engagement with the tilt cam 75. It may be appreciated that as the cam 75 rotates with the disc 31, the platform 17 is caused to tilt upward or downward. Normally, the platform 17 tilts downward as the scanning progresses toward and around the near end of the track, with the tilting being upward as the remote portions of the track are followed. By way of example, it has been found that a useful camming angle of 22 degrees served satisfactorily in a particular location.

A tilt cam spring 81 is provided between the frame 15 and the platform 17 to insure the engaging relation at all times of the cam 75 and follower 77, such that the latter arrangement may determine the vertical positioning of the platform 17 at all times.

When the camera 21 is equipped with a zoom type lens, such as 23, it is desirable to focus this lens for the distance between the animals tracked and the camera, which of course, is ever changing. For this purpose a standard clockwise-counterclockwise electric follow-up motor 91 is carried by the platform 17. The upper end of link 93 is fixed to the platform 17 and the lower end is connected to the control arm 95 of the motor 91, with the motor 91 being fixed to base 15. This electrical control permits translating the tilt motion into rectilinear focusing motion for the lens 23. Such a motorized zoom control lens is available from General Electric Company, under the description "Motorized Zoom Lens with Controls."

Figures 3, 4:
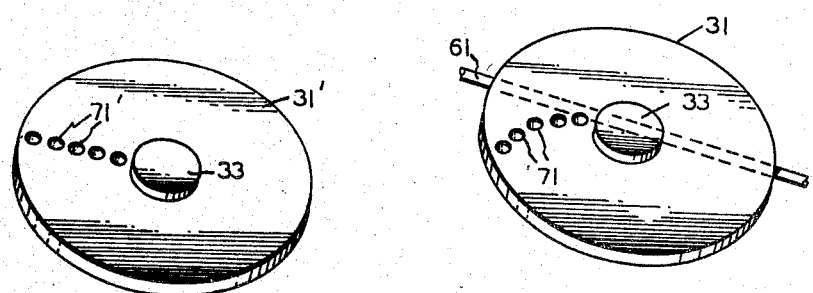
FIG. 3 is a view in perspective of a resolver disc adapted for spiral logistic motion, useful in panning oval type configurations.
FIG. 4 is a view in perspective of a resolver disc adapted for panning a circular configuration.

In FIG. 4 there is illustrated a modified type resolver disc 31' provided with holes 71' in diametrical alinement. This type resolver disc is adapted particularly for tracking circular configuration, and is adjustable to take into account various sized circular tracks and the line-of-sight distance.

Figure 5:
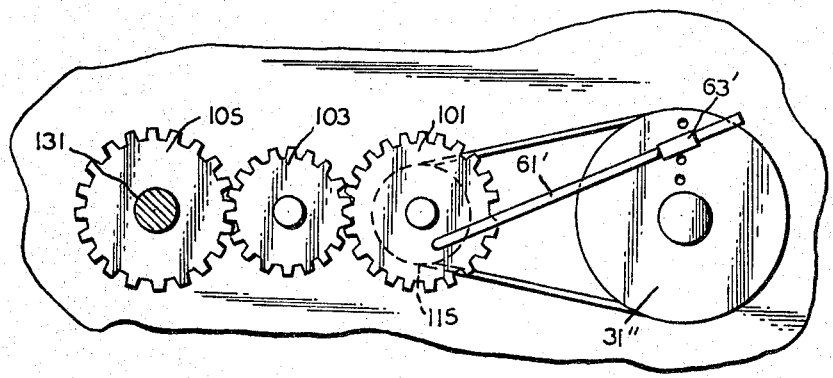
FIG. 5 is a schematic view in plan showing a modified arrangement of the invention of FIG. 1; and, FIG. 6 is a view in side elevation incorporating the structure of FIG. 5.

FIG. 5 is a schematic arrangement of a motion multiplier provision between the resolver disc 31" and the camera mount 25' for an automatic tracker in accordance with FIG. 1. The vector arm 61' is affixed to a gear 101 near or on its periphery. An intermediate direction reversal gear 103 couples the drive from gear 101 to camera mount gear 105, which in turn is fixed to the mount 25'. The gear 101 includes, for example, three times the number of teeth as the companion gear 103, which in turn contains the same number of teeth as the camera mount 105. This configuration obviously provides a multiplication of three.

The operation is the same as previously explained, in that when resolver disc 31' rotates, vector arm 61' slides relative to pivotal sleeve 63', which in turn drives the vector arm through an arc imparting partial rotation to gear 101. This movement is tripled through the gear train to provide greater panning scan for the camera 21'.

Figure 6:
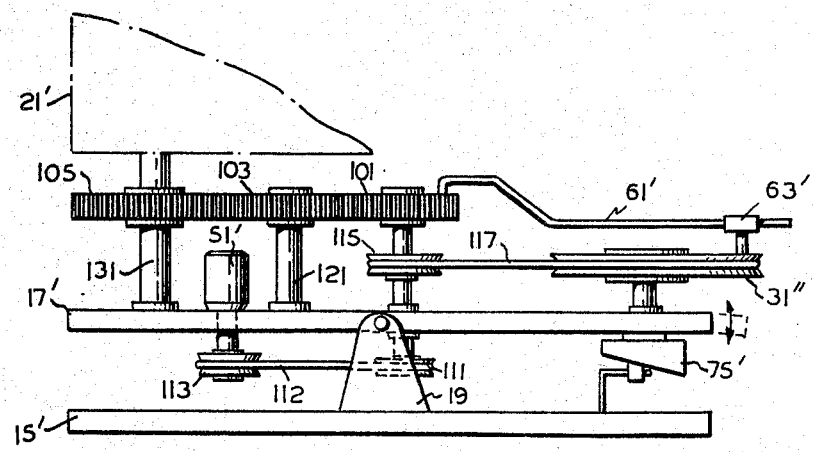

In FIG. 6 the structure for the schematic explained is depicted, including the platform 17', tilt cam 75', frame 15' and rocker or pivot 19.

In addition, it may be noted that motor 51' is carried on the upper side of platform 17' and drives resolver disc 31" by way of its own pulley 111, belt 112, idler pulley 113, and common shaft pulley 115, which is connected over belt 117 to the peripheral drive track of the resolver disc 31".

It is also apparent that vector arm 61' is connected near the periphery of driving gear 101, in turn meshing with gear 103 supported by shaft 121, and in turn driving the camera mount gear 105 journalled on shaft 131. The camera 21' is adapted to turn with gear on common shaft 131.

Other and further embodiments of the invention will become apparent to those skilled in the art from a reading of the foregoing specification when taken into consideration with the accompanying drawing. It is, therefore, intended that the invention be limited only by the appended claims.

What is claimed is:

1. An automatic tracker of a type adapted to trace the outline of a configuration from a vantage point comprising in combination a mount adapted to support a device to track the outline; platform means supporting said mount for rotation; resolver means also supported from the platform for rotation relative thereto; a vector arm fixed to the mount and extending to the resolver means; vector arm engaging means pivotally fixed to the resolver means and slidably engaging the vector arm whereby rotation of the resolver means turns the mount through an arc; frame means supporting the platform for pivotal movement; and, cam means disposed between the frame means and platform and moveable with the resolver means to tilt the mount relative to the frame along with the turning thereof.

2. The tracker of claim 1, wherein the resolver means is adapted to receive the vector arm sleeve for pivotal motion at a number of positions deployed along a spiral extending generally outwardly from the axis of rotation of the resolver means whereby the outline of a number of configurations varying in size may be traced for any given location of the vector arm sleeve.

3. The tracker of claim 1, including means connected between the frame means and the platform for translating tilt movement to movement in the direction of the configuration being traced.

4. The tracker of claim 1, including a motion multiplier in the form of a gear train disposed between the mount and the vector arm whereby motion of the vector arm is converted to gear train motion to rotate the mount.

5. An automatic tracking apparatus for mounting a camera to scan a remote configuration from a vantage point through panning and tilting of the camera comprising in combination a frame; a platform mounted for pivotal movement about a first axis relative to the frame; a camera mount mounted for rotation about a second axis relative to the platform; resolver means mounted on the platform for rotation about a third axis spaced from the second axis; vector arm means fixed to the mount and extending at least beyond the third axis of the resolver means; pivotal means disposed on the resolver means for receiving the vector arm means and adapted for relative movement thereto; means for rotating the resolver means; and, means disposed between the frame and the platform and operable with the resolver rotation to tilt the platform relative to the frame whereby the camera is caused to trace the outline of said configuration.

6. The tracker of claim 5, including means responsive to the tilting of the platform to translate such motion to back and forth movement generally in the direction of the configuration for focusing adjustment for the camera.

7. The tracker of claim 5, wherein the resolver means is adapted to receive the pivotal means at different spaced locations from the third axis on the resolver means whereby different sized configurations may be scanned.

8. The tracker of claim 5, including motion multiplier means disposed between the mount and connected to receive the relative motion established by the resolver means.

9. An automatic tracker apparatus mounting a camera to scan, through panning and tilting, a predetermined shaped configuration from a vantage point remote therefrom comprising in combination a mount for a camera; a frame; means supporting the camera mount from the frame for limited universal movement through first and second axes; means for providing uniform rotational motion; motion translating means supported from said frame means and responsive to the rotational motion for imparting back and forth panning motion to the camera mount and also including further means supported by the frame means and responsive to the rotational motion for limiting the camera mount movement about said first axis to cause tilting of the mount; said motion translating means and said further means limiting motion of the mount to a predetermined path determined by said configuration.

10. An automatic tracker apparatus mounting a camera to scan, through panning and tilting, a predetermined shaped configuration from a vantage point remote therefrom comprising, in combination, a mount for a camera having a lens capable of being focused; a frame; means supporting the camera mount from the frame for limited universal movement through first and second axes relative to the frame; said means comprising motion translating means for imparting back and forth panning motion to the camera mount about said second axis and also comprising further means responsive to the motion translating means for limiting the camera mount movement about said first axis to cause tilting thereof; and, means responsive to the tilting motion to focus said lens; said motion translating means and said further means limiting motion of the mount to a predetermined path determined by said configuration.

References Cited by the Examiner
UNITED STATES PATENTS 2,587,018   2/1952   Weisfeldt _____ 352—197

JOHN M. HORAN, *Primary Examiner.*